US012606485B2

(12) United States Patent
Li et al.

(10) Patent No.: US 12,606,485 B2
(45) Date of Patent: Apr. 21, 2026

(54) NANO-TITANIUM DIOXIDE/BIOCHAR COMPOSITE, AND PREPARATION METHOD AND USE THEREOF

(71) Applicant: QINGDAO UNIVERSITY OF TECHNOLOGY, Shandong (CN)

(72) Inventors: Shaochun Li, Shandong (CN); Xu Chen, Shandong (CN); Mengjun Hu, Shandong (CN); Ang Liu, Shandong (CN); Yongjuan Geng, Shandong (CN); Jialin Jiang, Shandong (CN)

(73) Assignee: Quingdao University of Technology (CN)

( * ) Notice: Subject to any disclaimer, the term of this patent is extended or adjusted under 35 U.S.C. 154(b) by 314 days.

(21) Appl. No.: 18/280,777

(22) PCT Filed: Feb. 9, 2023

(86) PCT No.: PCT/CN2023/075128
§ 371 (c)(1),
(2) Date: Sep. 7, 2023

(87) PCT Pub. No.: WO2023/221568
PCT Pub. Date: Nov. 23, 2023

(65) Prior Publication Data
US 2024/0174566 A1      May 30, 2024

(30) Foreign Application Priority Data
May 20, 2022      (CN) ......................... 202210558730.8

(51) Int. Cl.
| | |
|---|---|
| *C04B 18/02* | (2006.01) |
| *C04B 14/30* | (2006.01) |
| *C04B 28/02* | (2006.01) |
| *C04B 40/02* | (2006.01) |

(52) U.S. Cl.
CPC .......... *C04B 18/023* (2013.01); *C04B 14/305* (2013.01); *C04B 28/02* (2013.01); *C04B 40/0231* (2013.01)

(58) Field of Classification Search
CPC ... C01B 32/354; C01G 23/00; C01P 2004/80; C04B 18/023; C04B 14/305; C04B 28/02; C04B 40/0231; C04B 40/0039; C04B 18/24; C04B 28/04; C04B 18/10
See application file for complete search history.

(56) References Cited

U.S. PATENT DOCUMENTS

2014/0162873 A1      6/2014  Gu

FOREIGN PATENT DOCUMENTS

| | | | | |
|---|---|---|---|---|
| CN | 101704641 | 3/2012 | | |
| CN | 106166435 | 11/2016 | | |
| CN | 111908823 | 11/2020 | | |
| CN | 112387269 | 2/2021 | | |
| CN | 114873943 | 8/2022 | | |
| WO | WO-2021068218 A1 * | 4/2021 | ............... | C02F 1/30 |

OTHER PUBLICATIONS

International Search Report for PCT/CN2023/075128 Dated Apr. 19, 2023.
The Effect of Biochar and Carbonization Curing on the Strength and Permeability of Cement Moratar, Jun. 2021.
Office Action Summary for Application No. 202210558730.8 dated Sep. 30, 2022.
Effects of biochar on properties of cement mortar, 2021.

* cited by examiner

*Primary Examiner* — Anthony J Green
(74) *Attorney, Agent, or Firm* — C. Tumey Law Group PLLC

(57) ABSTRACT

Provided are a nano-titanium dioxide (NT)/biochar (BC) composite, and a preparation method and use thereof, which belong to the technical field of cement-based materials. NT is introduced into a porous structure of the micron-sized BC, which not only addresses the high aggregation of NT, but also reduces $Ca(OH)_2$ size and crystal growth orientation through effects such as filling and nucleation brought by NT in the porous structure of BC. In this way, more C—S—H gels are generated to fill the pores, thereby improving an interfacial transition zone (ITZ), which enhances the mechanical properties such as compressive strength and flexural strength. The NT/BC composite of the disclosure is doped into a cement-based material, which allows that in a surface layer of the cement-based material, $CO_2$ absorption capacity could be improved through carbon sequestration properties and the porous structure of the composite, and the carbonization of the surface layer could be accelerated by hydration accelerating properties of the NT to form a calcium carbonate surface protective layer, thereby improving durability of the cement-based material.

16 Claims, 7 Drawing Sheets

NANO-TITANIUM DIOXIDE/BIOCHAR COMPOSITE, AND PREPARATION METHOD AND USE THEREOF

CROSS REFERENCE TO RELATED APPLICATION

This application is a national stage application of International Patent Application No. PCT/CN2023/075128 filed on Feb. 9, 2023, which claims priority to Chinese Patent Application No. 2022105587308 filed with the China National Intellectual Property Administration (CNIPA) on May 20, 2022 and entitled "NANO-TITANIUM DIOXIDE/BIOCHAR COMPOSITE, AND PREPARATION METHOD AND USE THEREOF". The two applications each are incorporated herein by reference in its entirety as part of the present application.

TECHNICAL FIELD

The present disclosure relates to the technical field of cement-based materials, in particular to a nano-titanium dioxide (NT)/biochar (BC) composite, and a preparation method and use thereof.

BACKGROUND

Nano-titanium dioxide (NT) is one of the most widely used 0-dimensional nanomaterials. When being doped into a cement-based material, due to physical filling effect, self-locking effect, nucleation effect, and photocatalytic effect of NT, the green performance of the cement-based material such as compressive strength and self-cleaning could be improved to a certain extent. However, NT per se has a relatively strong intermolecular Van der Waals' force and does not participate in cement hydration reaction, leading to agglomeration of NT, which in turn affects the improvement on mechanical properties and durability of the cement-based material, and even causes negative effects.

Biochar (BC) is a carbon-rich solid that acts as soil amendment and stabilizer. Unlike traditional charcoal generally used as fuel, BC could be produced by pyrolysis in an air-free environment. Contrary to other incineration technologies, the incineration products of BC release less carbon dioxide into the atmosphere. Meanwhile, BC has adjustable pore structure, functional groups, and surface interfacial reactions. Therefore, BC could be used in various fields, such as soil remediation, wastewater treatment, chemical recovery, and catalytic biorefining reactions, as well as carbon capture and storage. BC could also be applied to cement materials, and affects the crystal growth manner of hydration products such as ettringite and C—S—H gel during the cement hydration through its porous structure and the "pozzolanic effect" of silicon-based biochar. In addition, carbon sequestration properties of BC show great promise in the carbon absorption and utilization of cement-based materials. However, due to the inherent properties such as brittleness and porosity, BC may negatively affect the compressive, flexural, and rupture strengths of cement-based materials.

SUMMARY

An object of the present disclosure is to provide a NT/BC composite, and a preparation method and use thereof. In the present disclosure. The NT/BC composite is doped into a cement-based material, to enhance mechanical properties of the cement-based material such as compressive strength and flexural strength while improving the durability of the cement-based material.

To achieve the above object, the present disclosure provides the following technical solutions.

The present disclosure provides a method for preparing a NT/BC composite, including the following steps:

subjecting a biomass to pyrolysis, drying, and grinding sequentially to obtain a micron-sized BC, the pyrolysis being conducted at a temperature of 600° C. to 750° C.;

mixing the micron-sized BC with a concentrated sulfuric acid to obtain a first mixture, and subjecting the first mixture to surface activation to obtain an activated BC;

mixing the activated BC with a dilute sulfuric acid to obtain a second mixture, and subjecting the second mixture to electric polarization to obtain a modified BC;

dispersing the modified BC and NT into water to obtain a dispersion; and mixing the dispersion with a piperazine solution to obtain a third mixture, and subjecting the third mixture to complex reaction at 180° C. for 10 h to 12 h to obtain the NT/BC composite.

In some embodiments, the pyrolysis is conducted for 1 h to 2 h.

In some embodiments, the surface activation is conducted at a temperature of 60° C. for 2 h to 3 h; and the concentrated sulfuric acid has a concentration of 18 mol/L.

In some embodiments, a mass ratio of the modified BC to the NT is 1:3.

In some embodiments, a mass ratio of the piperazine in piperazine solution to the NT is 1:2; and the piperazine solution has a mass percentage of 0.05%.

In some embodiments, the dilute sulfuric acid has a concentration of 10 mol/L; and the electric polarization is conducted for 2 h to 3 h.

In some embodiments, the method further includes adjusting a pH value of the dispersion to a range of 12 to 13 before mixing the dispersion with the piperazine solution.

The present disclosure further provides a NT/BC composite prepared by the method as described in the above technical solutions, which includes a micron-sized BC and NT attached to a surface and pores of the micron-sized BC, wherein the NT/BC composite has a three-dimensional porous structure.

The present disclosure further provides use of the NT/BC composite as described in the above technical solutions in preparation of a cement-based material.

In some embodiments, the cement-based material is exposed to a natural $CO_2$ environment after standard curing of the cement-based material is conducted.

The present disclosure provides a method for preparing a NT/BC composite, which includes the following steps: subjecting a biomass to pyrolysis, drying, and grinding sequentially to obtain a micron-sized BC, wherein the pyrolysis is conducted at a temperature of 600° C. to 750° C.; mixing the micron-sized BC with a concentrated sulfuric acid to obtain a first mixture, and subjecting the first mixture to surface activation to obtain an activated BC; mixing the activated BC with a dilute sulfuric acid to obtain a second mixture, and subjecting the second mixture to electric polarization to obtain a modified BC; dispersing the modified BC and NT into water to obtain a dispersion; and mixing the dispersion with a piperazine solution to obtain a third mixture, and subjecting the third mixture to complex reaction at 180° C. for 10 h to 12 h to obtain the NT/BC composite.

In the present disclosure, NT is introduced into the porous structure of the micron-sized BC, which not only addresses the high aggregation of NT, but also reduces $Ca(OH)_2$ size and crystal growth orientation through effects such as filling and nucleation brought by NT in the porous structure of BC. In this way, more C—S—H gels are generated to fill the pores, thereby improving an interfacial transition zone (ITZ), and enhancing the mechanical properties such as compressive strength and flexural strength.

The NT/BC composite of the present disclosure is doped into a cement-based material, which allows that in a surface layer of the cement-based material, $CO_2$ absorption capacity could be improved through carbon sequestration properties and the porous structure of the composite, and the carbonization of the surface layer could be accelerated by hydration accelerating properties of the NT to form a surface protective layer of calcium carbonate, thereby improving durability of the cement-based material. In the interior of the cement-based material, the composite gradually releases water through the water retention and hydrophilicity of the porous structure and a "small size effect", resulting in secondary hydration, thereby filling the pores and refining an internal structure, such that the cement-based material has excellent mechanical properties and durability.

DETAILED DESCRIPTION OF THE EMBODIMENTS

Figure 1:
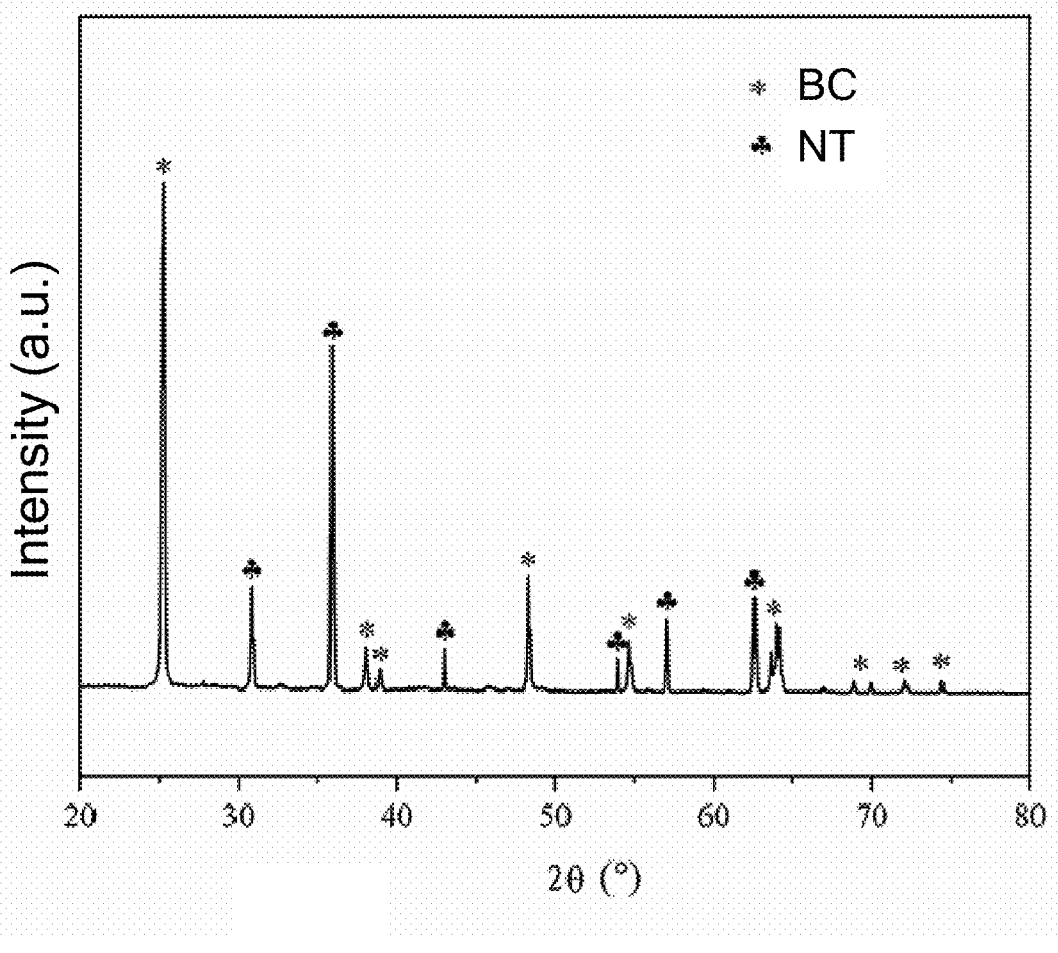
FIG. 1 shows an X-ray diffraction (XRD) pattern of the NT/BC composite prepared in Example 1.

The present disclosure is further described below in conjunction with the accompanying drawings and embodiments.

The present disclosure provides a method for preparing a NT/BC composite, including the following steps:

subjecting a biomass to pyrolysis, drying, and grinding sequentially to obtain a micron-sized BC, the pyrolysis being conducted at a temperature of 600° ° C. to 750° C.;

mixing the micron-sized BC with a concentrated sulfuric acid to obtain a first mixture, and subjecting the first mixture to surface activation to obtain an activated BC;

mixing the activated BC with a dilute sulfuric acid to obtain a second mixture, and subjecting the second mixture to electric polarization to obtain a modified BC;

dispersing the modified BC and NT into water to obtain a dispersion; and mixing the dispersion with a piperazine solution to obtain a third mixture, and subjecting the third mixture to complex reaction at 180° C. for 10 h to 12 h to obtain the NT/BC composite.

In the present disclosure, unless otherwise specified, all raw materials used are commercially available products well known to those skilled in the art.

In the present disclosure, the biomass is subjected to pyrolysis, drying, and grinding sequentially to obtain the micron-sized BC.

In the present disclosure, there is no special requirement for the type of the biomass, and any biomass well-known in the art may be used, such as olivine, sawdust, buckwheat straw, waste wood, animal and plant residues or feces, and hazelnut shells. In some embodiments, the biomass is olivine, sawdust, or buckwheat straw.

In some embodiments, the biomass is subjected to milling before the pyrolysis. There is no special requirement for milling process, and the milling process well known in the art may be used. In some embodiments, the pyrolysis is conducted in a pyrolysis reactor. In some embodiments, the pyrolysis is conducted at a temperature of 600° ° C. to 750° C., and preferably 650° ° C. to 700° C. In some embodiments, the pyrolysis is conducted for 1 h to 2 h, and preferably 2 h.

In some embodiments, a blocky BC is obtained after the pyrolysis. The blocky BC is easy to absorb water vapor in the air, affecting the modification effect; therefore, the blocky BC is subjected to drying.

In some embodiments, the drying is conducted at a temperature of 105° C. to 120° C. In some embodiments, the drying is conducted for 12 h. In the present disclosure, after the drying is completed, a resulting BC is subjected to grinding. In some embodiments, the grinding is conducted by grinding the resulting BC with an electric-controlled mortar and pestle for 15 min, and then grinding in a turbo sand mill for 10 min at 50 Hz and 800 rpm to obtain the micron-sized BC. In some embodiments, the micron-sized BC has a particle size of 100 μm to 200 μm.

In some embodiments, after the micron-sized BC is obtained, it is mixed with a concentrated sulfuric acid and subjected to surface activation to obtain an activated BC. In some embodiments, the concentrated sulfuric acid has a concentration of 18 mol/L. There is no special requirement for the amount of the concentrated sulfuric acid, as long as the concentrated sulfuric acid could fully immerse the micron-sized BC. In some embodiments, the surface activation is conducted at a temperature of 60° C. In some embodiments, the surface activation is conducted for 2 h to 3 h. The surface activation of the micron-sized BC aims to enhance the attachment of NT on the BC structure.

In some embodiments, after the surface activation is completed, a resulting activation system is cooled naturally, the BC obtained after the surface activation is sequentially washed with absolute ethanol and deionized water, and then centrifuged, filtered, and dried to obtain the activated BC.

In some embodiments, after the activated BC is obtained, it is mixed with a dilute sulfuric acid and subjected to electric polarization to obtain a modified BC.

In some embodiments, the dilute sulfuric acid has a concentration of 10 mol/L; in some embodiments, the electric polarization is conducted for 2 h to 3 h. There is no special requirement for the amount of the dilute sulfuric acid, as long as the activated BC could be immerged. There is no special requirement for conditions of the electric polarization, as long as a polarization effect could be achieved. In the present disclosure, the BC could be further activated by the electric polarization.

In some embodiments, after the electric polarization is completed, the BC obtained after the electric polarization is sequentially washed with absolute ethanol and deionized water, and then centrifuged, filtered, and dried to obtain the modified BC.

In some embodiments, after the modified BC is obtained, the modified BC and NT are dispersed into water to obtain a dispersion.

In some embodiments, the NT has a particle size of 5 nm to 15 nm; in some embodiments, the NT has a crystal form of rutile. In some embodiments, a mass ratio of the modified BC to the NT is 1:3. In the present disclosure, the mass ratio of the modified BC to the NT is controlled in the above range to obtain a composite with the best performance.

In the present disclosure, there is no special requirement for the dispersion method; in some embodiments, the modified BC and the NT are directly added into water and stirred evenly. In some embodiments, the water is deionized water. There is no special requirement for an amount of water, as long as the modified BC and NT could be uniformly dispersed.

In some embodiments, after the dispersion is obtained, it is mixed with a piperazine solution and subjected to complex reaction to obtain the NT/BC composite.

In some embodiments, a pH value of the dispersion is adjusted to 12 to 13 before the dispersion is mixed with the piperazine solution. The interior of the cement-based material is at an alkaline environment, and adjusting the pH value of the dispersion to alkaline is beneficial to the use in the cement-based material. In some embodiments, the pH value is adjusted by using a mixed solution of 0.02 mol/L $NaNO_3$ and 2 mol/L NaOH.

In some embodiments, after the dispersion is obtained, it is mixed with the piperazine solution and subjected to complex reaction at 180° C. for 10 h to 12 h to obtain the NT/BC composite.

In some embodiments, a mass percentage of the piperazine solution is 0.05%. In some embodiments, a mass ratio of the piperazine in the piperazine solution to the NT is 1:2. In the present disclosure, the NT may be aminated by the piperazine, and aminated NT particles may increase the attraction and absorption rate of $CO_2$.

In some embodiments, the complex reaction is conducted in a reactor. The NT attaches to the BC during the complex reaction.

In some embodiments, after the complex reaction is completed, a resulting reaction system is cooled, then washed with absolute ethanol and deionized water in sequence, and then centrifuged, filtered, and dried to obtain the NT/BC composite.

The present disclosure further provides a NT/BC composite prepared by the method described in the above technical solutions. The NT/BC composite includes a micron-sized BC, and NT attached to a surface and pores of the micron-sized BC, wherein the NT/BC composite has a three-dimensional porous structure.

In the present disclosure, NT is introduced into the porous structure of the micron-sized BC, which not only addresses the high aggregation of NT, but also reduces $Ca(OH)_2$ size and crystal growth orientation through effects such as filling and nucleation brought by NT in the porous structure of BC. In this way, more C—S—H gels are generated to fill the pores, thereby improving an interfacial transition zone (ITZ), and enhancing the mechanical properties such as compressive strength and flexural strength.

The NT/BC composite of the present disclosure is doped into a cement-based material, which allows that in a surface layer of the cement-based material, $CO_2$ absorption capacity could be improved through carbon sequestration properties and the porous structure of the composite, and the carbonization of the surface layer could be accelerated by a hydration accelerating property of the NT to form a surface protective layer of calcium carbonate, thereby improving durability of the cement-based material. In the interior of the cement-based material, the composite gradually releases water through the water retention and hydrophilicity of the porous structure and a "small size effect", resulting in secondary hydration, thereby filling the pores and refining an internal structure, such that the cement-based material has excellent mechanical properties and durability.

The present disclosure further provides use of the NT/BC composite described in the above technical solutions in preparation of a cement-based material. There is no special limitation on the cement-based material, and any cement-based material known in the art may be used, such as mortar and concrete. In some embodiments, the NT/BC composite is doped into the cement-based material in an amount of 3% to 5% by mass.

In the present disclosure, there is no special requirement for a preparation process of the cement-based material, and the preparation process well known in the art may be used. In some embodiments, the cement-based material is exposed to a natural $CO_2$ environment after standard curing is conducted.

Most of the existing technologies are limited to single-doping with NT or BC at different amounts. In terms of carbon absorption, the single-doping types with NT or BC are both applied to a high-concentration $CO_2$ environment for carbonation curing to promote carbon absorption in the atmosphere. However, there are a series of problems such as high cost in creating such a high-concentration $CO_2$ environment. In the present disclosure, not only the synchronous improvement of mechanical properties (such as compressive strength and flexural strength) and durability is achieved, but also problems such as high cost caused by creating a high-concentration $CO_2$ environment are avoided. On the one hand, BC has carbon sequestration properties and shows a strong attraction to $CO_2$. On the other hand, the porous nature of the composite accelerates the absorption of $CO_2$ in the early stage of hydration, and accelerating cement hydration of the NT accelerates the carbonation effect. The NT/BC composite enables the cement-based material to exhibit high carbon sequestration capacity and carbonation curing effect in a natural $CO_2$ environment.

The NT/BC composite, and the preparation method and use thereof provided by the present disclosure will be described in detail in conjunction with the following examples, but these examples should not be understood as limiting the scope of the present disclosure.

Example 1

(1) Olivine was milled and placed in a pyrolysis reactor, and then subjected to pyrolysis at 700° ° C. for 2 h to obtain a blocky BC;

(2) the blocky porous BC was dried in an oven at 120° C. for 12 h, then ground with an electric-controlled mortar and pestle for 15 min, and then ground for 10 min in a turbo sand mill at 50 Hz and 800 rpm to obtain a micron-sized BC;

(3) the micron-sized BC was mixed with a concentrated $H_2SO_4$ (18 mol/L) to obtain a first mixture, and the first mixture was subjected to surface activation by heating at 60° C. for 2 h; after that, the resulting product was cooled naturally, then washed with absolute ethanol and deionized water in sequence, and then centrifuged, filtered, and dried to obtain an activated BC;

(4) the activated BC was mixed with 10 mol/L $H_2SO_4$ solution to obtain a second mixture, and the second mixture was then subjected to electric polarization for 2 h; after that the resulting reaction product was washed with absolute ethanol and deionized water in sequence, and then centrifuged, filtered, and dried to obtain a modified BC;

(5) the modified BC and NT (a rutile purchased in the market, having a particle size of 5 nm to 15 nm and being hydrophilic) were added to a beaker containing 50 mL of deionized water at a mass ratio of 1:3, and mixed evenly by stirring; during the stirring a pH value of a resulting mixed solution was adjusted to 12.5±0.5 by using a mixed solution of 0.02 mol/L $NaNO_3$ and 2 mol/L NaOH; after that, the resulting mixed alkaline solution and a piperazine (PZ) solution having a mass percentage of 0.05% were poured into a reactor at a mass ratio of the piperazine in the PZ solution to NT of 1:2, and then subjected to complex reaction by heating the reactor in an oven at 180° C. for 12 h; and (6) the resulting mixed solution after the complex reaction was cooled, then washed with absolute ethanol and deionized water in sequence, and then centrifuged, filtered, and dried to obtain a NT/BC composite.

Example 2

This example was performed as described in Example 1, except that the olivine was replaced by buckwheat stalk.

Example 3

This example was performed as described in Example 1, except that the olivine was replaced by sawdust.

Example 4

This example was performed as described in Example 1, except that the pyrolysis was conducted at 600° C.

Comparative Example 1

In this comparative example, NT was used alone.

Comparative Example 2

Olivine was milled and placed in a pyrolysis reactor, and then subjected to pyrolysis at 700° C. for 2 h to obtain a blocky BC; and the blocky porous BC was dried in an oven at 120° C. for 12 h, then ground with an electric-controlled mortar and pestle for 15 min, and then ground for 10 min in a turbo sand mill at 50 Hz and 800 rpm to obtain a micron-sized BC.

Comparative Example 3

This example was performed as described in Example 1, except that steps (3) and (4) were not conducted, that is, BC was not modified, and an NT/BC composite obtained was prepared from unmodified BC.

Performance Characterization:

1. The NT/BC composite prepared in Example 1 was characterized by XRD, and the result is shown in FIG. 1. It can be seen from FIG. 1 that the characteristic peaks of NT and BC are present simultaneously in the NT/BC composite, indicating that the composite effect of NT and BC is relatively desirable.

Figure 2:
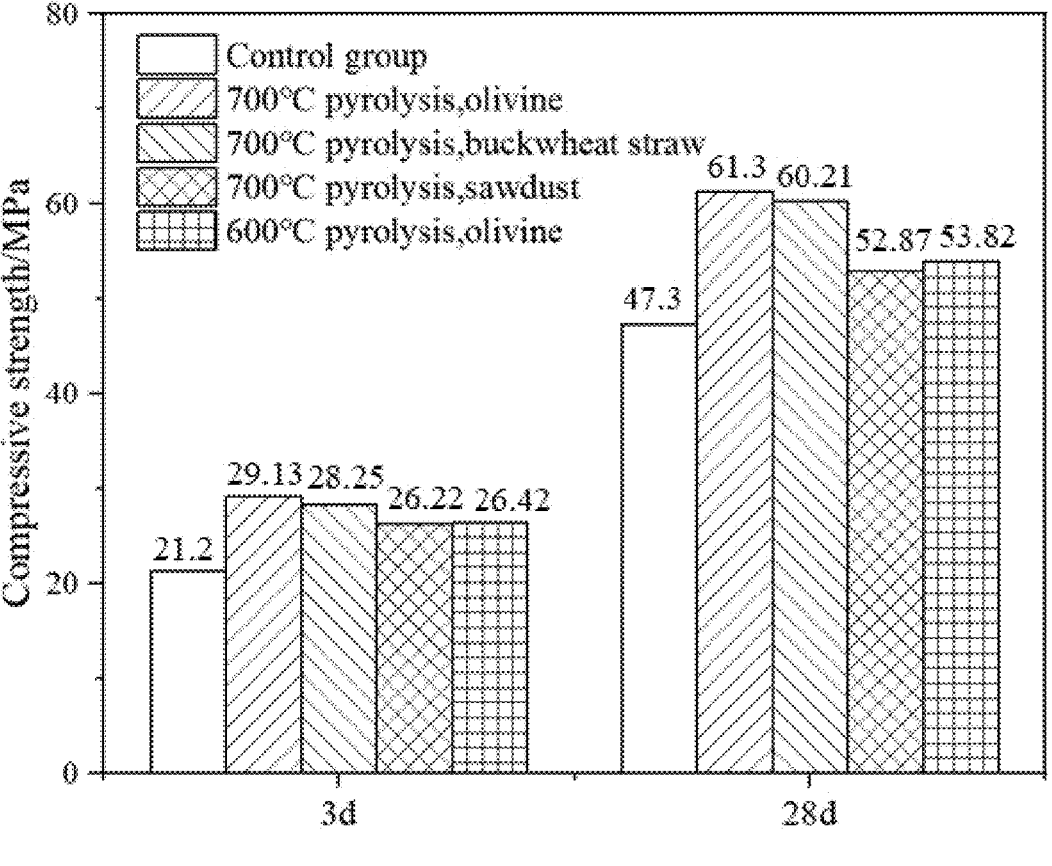
FIG. 2 shows compressive strength of mortar materials doped with the NT/BC composites of Examples 1 to 4 respectively and the mortar material of the control group at different ages.
Figure 3:
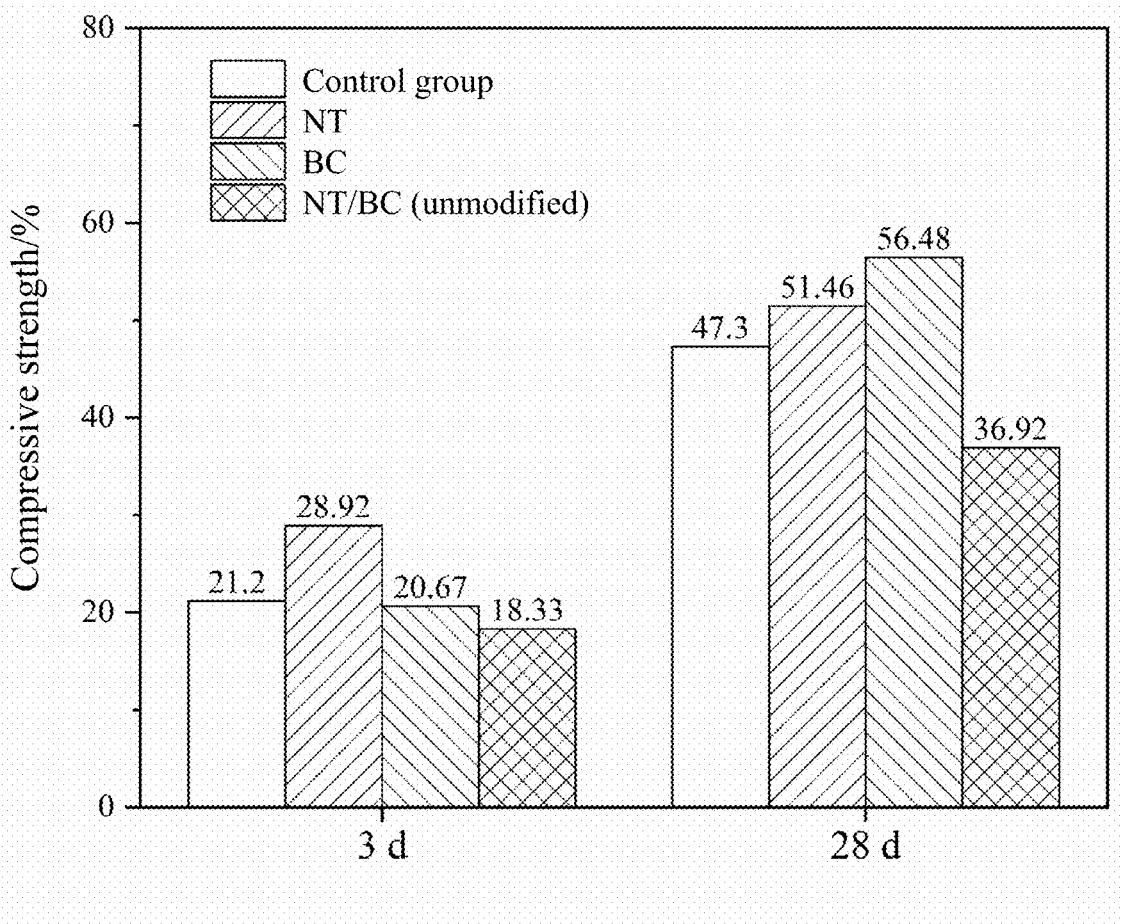
FIG. 3 shows compressive strength of mortar materials doped with the materials of Comparative Examples 1 to 3 respectively and the mortar material of the control group at different ages.

2. The NT/BC composites prepared in each example, the NT (in Comparative Example 1), the micron-sized BC (in Comparative Example 2), and the NT/BC composite prepared from unmodified BC (in Comparative Example 3) were applied to cement mortar (with water-binder ratio w/b=0.35) respectively, and the performance of the resulting products was tested. Specific steps were conducted as follows:

18 g of the NT/BC composite (mNT:mBC=3:1), the NT, the BC, and the NT/BC composite prepared from unmodified BC were mixed with 135 mL of water in a stirring pot separately and then stirred for 15 s; then 450 g of cement (P.O 42.5) was added therein. The resulting mixture was stirred rapidly by a mortar mixer for 30 s; after that, 1,350 g of standard sand was added thereto by stirring at a low speed for another 30 s, then followed by 30 s of rapid stirring, 60 s of standing manual stirring, and 60 s of rapid stirring. After that, a freshly mixed mortar was prepared and poured into a mold. After standard curing (20±2° C., humidity >95%) for 24 h, the mold was removed, and the compressive strength of the resulting mortar materials after removing the mold was measured at age of 3 days and 28 days, as shown in FIG. 2 and FIG. 3. The corresponding results are shown in Table 1. Notes: the mixing was conducted by a standard cement mortar mixer; the rapid and low speeds were constant.

The control group in Table 1 was traditional cement mortar material without being doped with other materials, which was prepared by the following steps:

135 mL of water was added in a stirring pot; 450 g of cement (P.O 42.5) was added therein, and the resulting mixture was stirred rapidly by a mortar mixer for 30 s. After that, 1,350 g of standard sand was added thereto by stirring at a low speed for another 30 s, then followed by 30 s of rapid stirring, 60 s of standing manual stirring, and 60 s of rapid stirring. After that, a freshly mixed traditional cement mortar material was prepared and poured into a mold. After standard curing for 24 h, the mold was removed, and the compressive strength of the resulting mortar material after removing the mold were measured at age of 3 days and 28 days, as shown in FIG. 2 and FIG. 3. The corresponding results are shown in Table 1.

TABLE 1

Compressive strength, calcium hydroxide (CH) content, and
CaCO₃ content of the mortar materials doped with the materials
prepared in Examples and Comparative Examples

| Groups | Compressive strength/MPa | | CH content/% | CaCO₃ content/% |
|---|---|---|---|---|
| | 3 d | 28 d | | |
| Control group | 21.2 | 47.3 | 0.52 | 2.37 |
| Example 1 | 29.13 | 61.36 | 0.45 | 4.16 |
| Example 2 | 28.25 | 60.21 | 0.47 | 3.52 |
| Example 3 | 26.22 | 52.87 | 0.38 | 3.32 |
| Example 4 | 26.42 | 53.82 | 0.49 | 3.74 |
| Comparative Example 1 (NT) | 28.92 | 51.46 | 0.58 | 2.13 |
| Comparative Example 2 (BC) | 20.67 | 56.48 | 0.41 | 2.89 |
| Comparative Example 3 (unmodified) | 18.33 | 36.92 | 0.48 | 2.61 |

As shown by the results in Table 1, compared with the control group, the addition of the NT/BC composites prepared in Examples 1 to 4 significantly improves the compressive strength at age of 3 days and 28 days, and also plays a role in significant improvement on the flexural strength. In terms of compressive strength and flexural strength improvement, the performance of NT/BC composites is significantly better than that of NT and BC alone; the performance of NT/BC composites prepared by modified BC is better than that of NT/BC composite prepared by unmodified BC.

Figure 4:
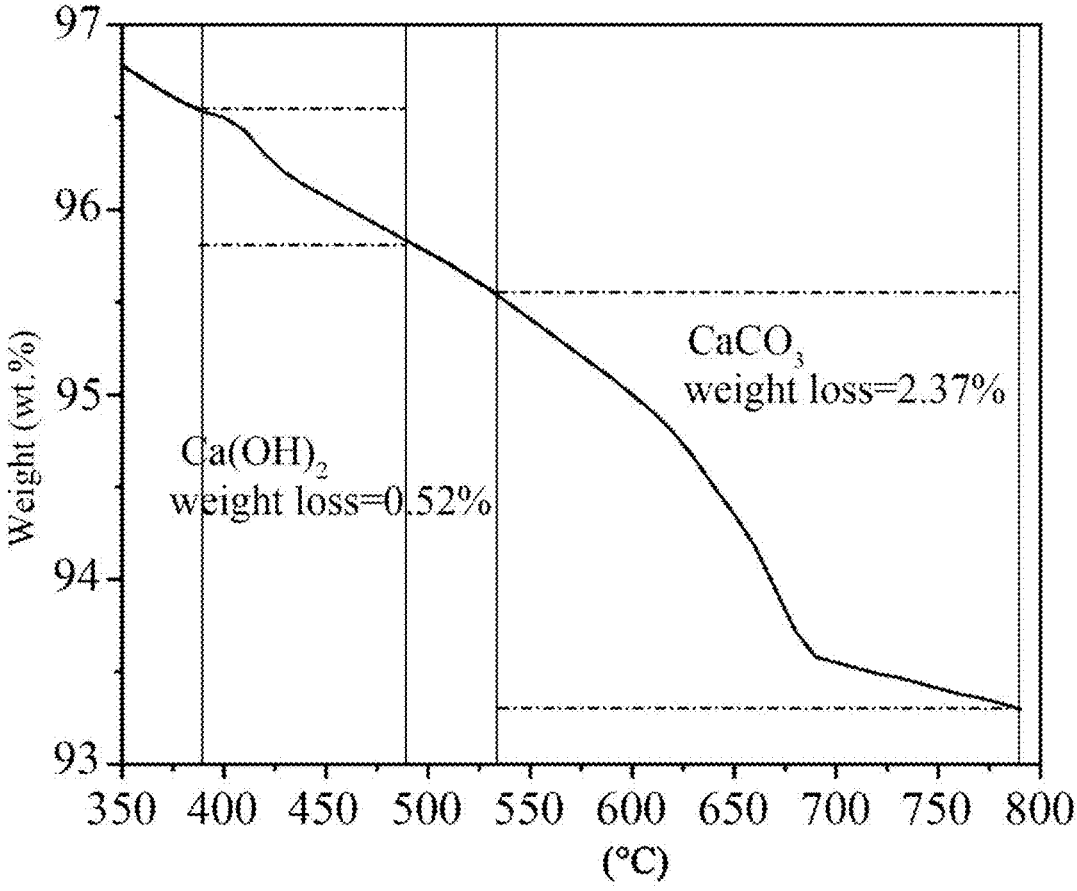
FIG. 4 shows a thermogravimetric analysis (TGA) diagram of a surface layer of the mortar material of the control group.

In addition, under the environment of natural $CO_2$ exposure, the TGA of the surface layer of the mortar material of the control group was measured at 24 h after mold removal, and the result is shown in FIG. 4. The content changes of $Ca(OH)_2$ and $CaCO_3$ are obtained by the TGA.

Figure 5:
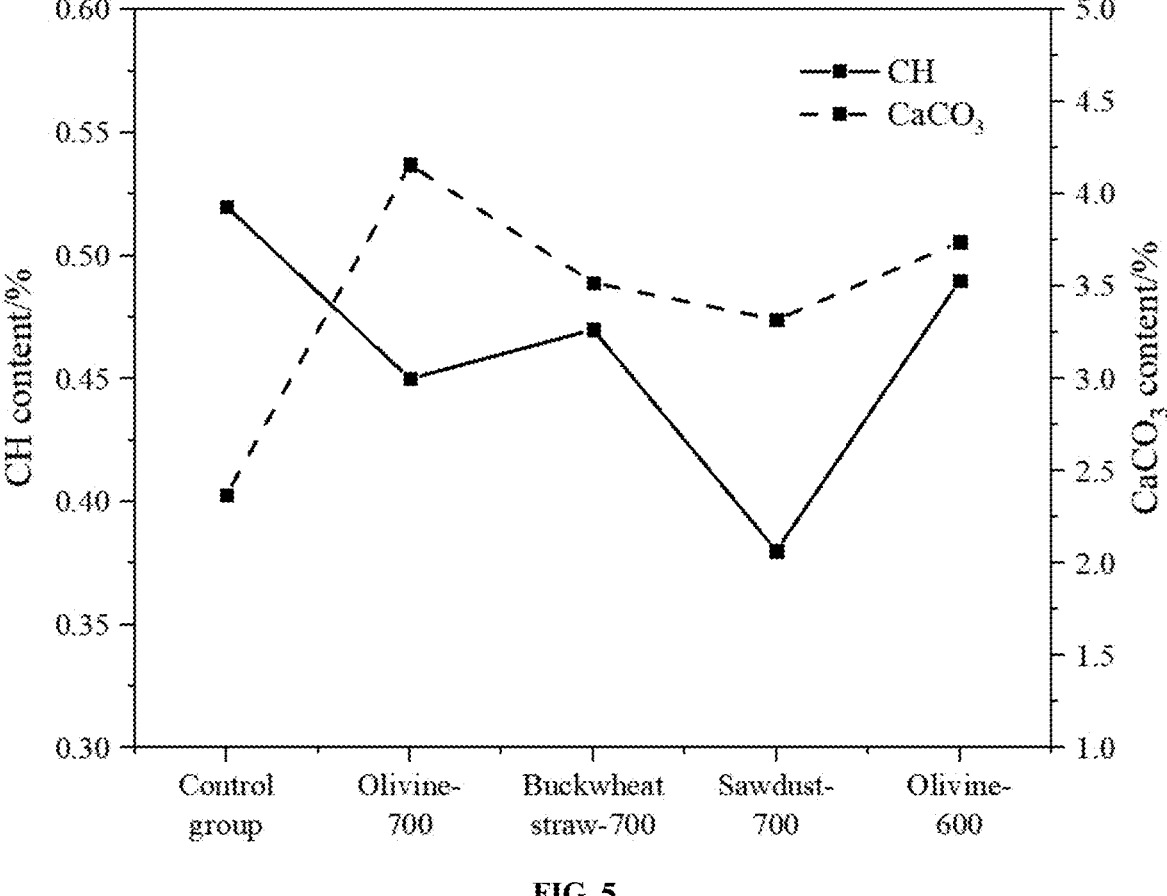
FIG. 5 shows TGA results of mortar materials doped with the NT/BC composites of Examples 1 to 4 respectively and the mortar material of the control group.
Figures 6, 7:
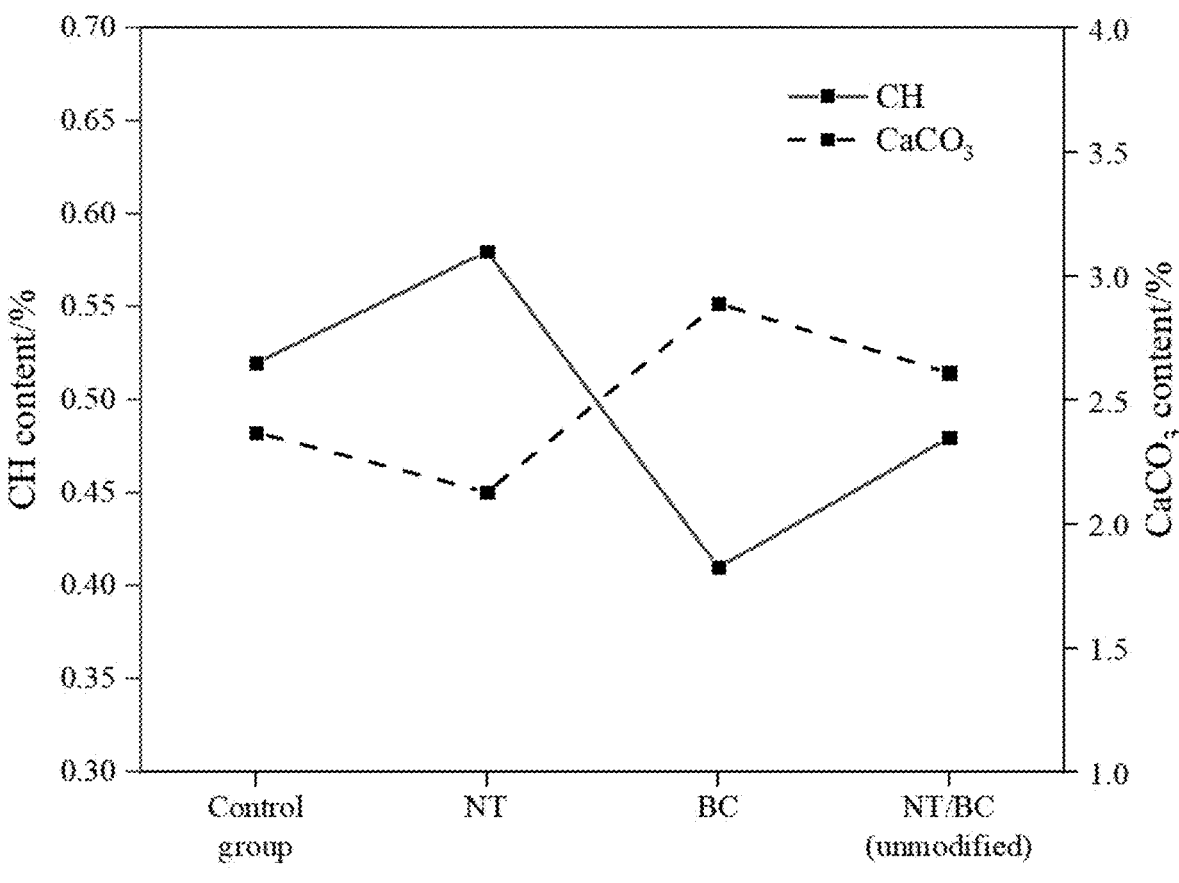
FIG. 6 shows TGA results of mortar materials doped with the materials of Comparative Examples 1 to 3 respectively and the mortar material of the control group.
FIG. 7 shows a carbonized layer that appears after spraying phenolphthalein onto the mortar material doped with the NT/BC composite of Example 1.

The mortar materials prepared by adding the materials of each example and comparative example were exposed to natural $CO_2$ environment. The TGA of the surface layer of the mortar materials was measured at 24 h after mold removal, and the TGA result is shown in FIG. 5 and FIG. 6, and the corresponding data is shown in Table 1. As shown in FIG. 5, FIG. 6, and Table 1, compared with single-doped NT or BC, the NT/BC composites in Examples 1 to 4 increases the $CaCO_3$ content, indicating that the carbon absorption is enhanced.

Figure 8:
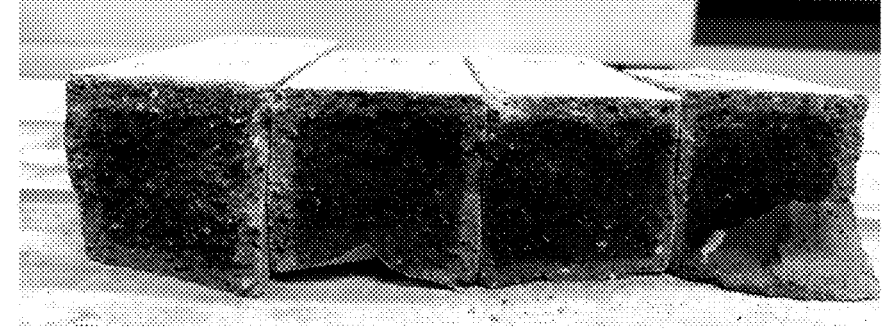
FIG. 8 shows carbonized layers that appear after spraying phenolphthalein onto mortar materials doped with the NT/BC composites of Examples 1 to 4 respectively.
Figure 9:
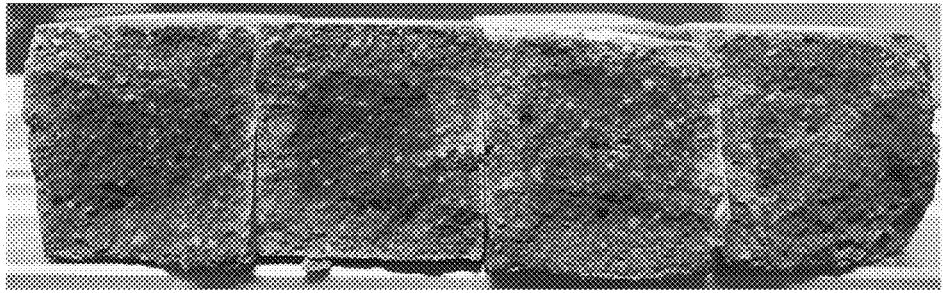
FIG. 9 shows the effect that appears after spraying phenolphthalein onto the mortar material of the control group and mortar materials doped with Comparative Examples 1 to 3 respectively.

The effects that appear after spraying phenolphthalein onto the mortar material of the control group and mortar materials doped with materials of Examples 1 to 4 and Comparative Examples 1 to 3, respectively, are shown in FIG. 7 to FIG. 9. FIG. 7 shows a carbonized layer that appears after spraying phenolphthalein onto the mortar material doped with the NT/BC composite of Example 1. FIG. 8 shows a carbonized layer that appears after spraying phenolphthalein onto the mortar material doped with the NT/BC composites of Examples 1 to 4 respectively, where Example 2, Example 4, Example 1, and Example 3 are arranged from left to right in sequence. FIG. 9 shows the effect that appears after spraying phenolphthalein onto the mortar material of the control group and the mortar materials doped with the materials of Comparative Examples 1 to 3 respectively, where control group, Comparative Example 1, Comparative Example 2, and Comparative Example 3 were arranged from left to right in sequence. Microscopic tests shows that a dense carbonized layer is formed on the surface of the mortar material prepared by incorporating the NT/BC composites of Examples 1 to 4 (FIG. 7), thus preventing the continuous deepening of carbonization. The mortar material prepared by incorporating the materials of Example 2 was exposed to natural $CO_2$ environment, and it was measured that the CH content of the surface layer of the mortar material do not decrease significantly at 24 h after mold removal. This is because buckwheat straw has a certain pozzolanic effect as a silica-based biomass. In addition, it is also observed that a dense carbonized layer is formed on the surface layer through microscopic inspection, and the carbonized depth is inferior to that of Example 1. The surface of the mortar material only doped with NT or BC do not form a carbonized layer and the carbonization depth was higher, and the internal structure is less compact, which is reflected in the macroscopic mechanical properties. compared with the control group, the mortar material doped with NT/BC composite prepared from unmodified BC has increased carbon absorption, but no dense carbonized layer formed on the surface, and higher carbonized depth.

The above are merely preferred embodiments of the present disclosure. It should be noted that several improvements and modifications may further be made by a person of ordinary skill in the art without departing from the principle of the present disclosure, and such improvements and modifications should also be deemed as falling within the scope of the present disclosure.

What is claimed is:

1. A method for preparing a nano-titanium dioxide (NT)/biochar (BC) composite, comprising the following steps:
   subjecting a biomass to pyrolysis, drying, and grinding sequentially to obtain a micron-sized BC, the pyrolysis being conducted at a temperature of 600° C. to 750° C.;
   mixing the micron-sized BC with a concentrated sulfuric acid to obtain a first mixture, and subjecting the first mixture to surface activation to obtain an activated BC;
   mixing the activated BC with a dilute sulfuric acid to obtain a second mixture, and subjecting the second mixture to electric polarization to obtain a modified BC;
   dispersing the modified BC and NT into water to obtain a dispersion; and
   mixing the dispersion with a piperazine solution to obtain a third mixture, and subjecting the third mixture to complex reaction at 180° C. for 10 h to 12 h to obtain the NT/BC composite.

2. The method according to claim 1, wherein the pyrolysis is conducted for 1 h to 2 h.

3. The method according to claim 1, wherein the surface activation is conducted at a temperature of 60° C. for 2 h to 3 h; and the concentrated sulfuric acid has a concentration of 18 mol/L.

4. The method according to claim 1, wherein a mass ratio of the modified BC to the NT is 1:3.

5. The method according to claim 1, wherein a mass ratio of piperazine in the piperazine solution to the NT is 1:2; and the piperazine solution has a mass percentage of 0.05%.

6. The method according to claim 1, wherein the dilute sulfuric acid has a concentration of 10 mol/L; and the electric polarization is conducted for 2 h to 3 h.

7. The method according to claim 1, further comprising adjusting a pH value of the dispersion to a range of 12 to 13 before mixing the dispersion with the piperazine solution.

8. The method according to claim 1, wherein the micron-sized BC has a particle size of 100 μm to 200 μm.

9. The method according to claim 1, wherein the NT has a particle size of 5 nm to 15 nm.

10. The method according to claim 1, wherein the NT has a crystal form of rutile.

11. A NT/BC composite prepared by the method according to claim 1, comprising a micron-sized BC, and NT attached to a surface and pores of the micron-sized BC, wherein the NT/BC composite has a three-dimensional porous structure.

12. The method according to claim 2, wherein the NT has a crystal form of rutile.

13. The method according to claim 3, wherein the NT has a crystal form of rutile.

14. The method according to claim 4, wherein the NT has a crystal form of rutile.

15. The method according to claim 5, wherein the NT has a crystal form of rutile.

16. The method according to claim 6, wherein the NT has a crystal form of rutile.

* * * * *